Patented May 7, 1935

2,000,183

UNITED STATES PATENT OFFICE 2,000,183

METHOD FOR WORKING UP AURIFEROUS AND CUPRIFEROUS ARSENICAL PYRITES

Axel Rudolf Lindblad, Djursholm, Sweden

No Drawing. Application June 13, 1934, Serial No. 730,535. In Sweden February 19, 1934

5 Claims. (Cl. 75—62)

The present invention relates to a new method for use in working up auriferous and cupriferous arsenical pyrites also, arsenical pyrites in mixture with sulphurous pyrites, for the purpose of achieving both reduced or decreased loss of gold and cheaper cost of smelting. The characteristic feature of the invention is that some of the ore is roasted and smelted in a flame-furnace or shaft furnace in the ordinary way for the purpose of getting a matte, which is then subjected to blast in a converter, while another part of the ore, after having been subjected to roasting, is charged direct into the converter to be subjected to blast together with the matte from the first-mentioned part of the ore which has been smelted in a flame-furnace or shaft furnace.

In all smelting of auriferous ores it is unavoidable that some loss of gold occurs, but it is, of course, very important that this loss be as minute as possible. The generally current idea has been that loss of gold occurs by reason of the finely divided matte particles being kept suspended or distributed in the slag. Even here the assumption has been put forward that the gold should occur in the slag as a colloidal solution, whereas the occurence of a genuine solution has as a rule been contested. Far-reaching researches recently carried out have, however, fully proved that at least under certain conditions the gold may occur in the slag as a genuine solution, and that the loss of gold occasioned for this reason, at least when treating or working up certain ores, is quantitatively the most important. Researches have furthermore shown that the gold is distributed between the slag and the matte in proportion to the dissolving capacity for gold right up to the moment when equilibrium occurs.

For the purpose of reducing the loss of gold there exist obviously two active methods. One is to make the dissolving capacity for gold in the matte in relation to that of the slag as favourable as possible. The other, to reduce the gold content of the matte, which, in fact is the same as to reduce the gold content of the ore charged into the furnace. To increase the solubility for gold in the matte can most simply and easily be done by increasing its copper content. But this expedient is not always possible or practicable, because a sufficient quantity of rich copper ores is often not available. If the gold content of the charge is extremely high it will also be difficult, even if rich copper ore is available, merely in this way to achieve the desired result. There remains then the process of reducing the gold content in the matte, in order to also obtain by this means a lower gold content in the slag.

The present invention is chiefly making use of the last-mentioned possibility, viz. to reduce the gold content of the matte, and this is done in such a way that part of the ore is run past the furnace in which the smelting of the matte takes place, in order to be charged direct into the converter.

The best effect is obtained with the present invention when ore with a high gold content is smelted together with ore having a lower gold content than the former, as a rule, this will mean ore of the kind rich in copper. This is especially the case in working up auriferous and cupriferous arsenical pyrites in a mixture with copper or sulphur pyrites, such as is the case, by way of example, with the Boliden ore—an ore occuring f. i. in Boliden, Sweden. The arsenical pyrites there have as a rule a remarkably high gold content, but only a trifling amount of copper, whereas the mixed part of the ore, richer in sulphurous pyrites and copper pyrites, contains less gold but more copper. If, now, in accordance with the present invention some of the arsenical pyrites that are richest in gold are roasted separately and charged direct into the converter, together with the matte from the remaining ore, smelted in a flame furnace or shaft furnace, the result is that a relatively large part of the gold need never pass through the matte. As a rule, conditions and circumstances are such that more than half the total gold content can be concentrated into 10 to 20 percent of the total quantity of ore. If, now, this comparatively small quantity is roasted and charged direct into the converter, the result is in the case stated that the gold content of the matte is reduced to about half, which entails a slag that is much poorer in gold.

When the dissolving capacity for gold in the matte is increased with a higher copper content, it is, as a matter of course, advantageous, as far as ever possible, to adapt the distribution of the ore in such a way that ore poor in copper is charged direct into the converter, while that which is richer in gold is smelted to form a matte or converted into a matte by smelting.

In the roasting of that part of the ore that is to go direct into the converter it is suitable and advisable that time, temperature and amount of air are adapted in such a way that any arsenic contained in the ore is practically altogether roasted out, whereas the bulk of any suplhur contained in the ore is allowed to remain. This is feasible, for arsenic passes off more easily and at a lower temperature than sulphur. Ore containing 10 to 20 percent of arsenic can in this way without difficulty be roasted down to 0.2 percent As, and below, whereas at the same time more than half the sulphur remains in the purple ore. For, it is important that a relatively large part of the sulphur is retained for the purpose of getting the necessary heat for treating the ore in the converter, where the sulphur, on combustion, is to supply the extra heat required for the reaction. It is furthermore important that the roasting be regulated in such a way that the bulk of any iron contained in the ore remains in the roasted goods as dual value (di-valent) an oxidation of the iron to triple value (trivalent) may entail too much cooling off of the converter, because the triple value iron in being turned into slag has to be reduced to dual value iron.

In the preceding mention has been made of the possibility to make use in the smelting of matte of a flame-furnace or a shaft furnace. But it is best for the purpose nearly always to use a flame-furnace, which, amongst others, presents the advantage that the relatively metalliferous slag obtained in the converter in blasting, can be conveyed there in a smelted condition so as to leave there the process in the company of the slag formed in the smelting of the matte.

By the present invention is gained the benefit, with a trifling sacrifice of plant- and operation cost, to achieve a much better recovery of gold and a not inconsiderable cheapening of the whole operation. Furthermore, the benefit is gained that the arsenious acid (arsenious trioxide) obtained in roasting the part of the ore that is richer in arsenic, is much purer in respect of selenium and other troublesome substances, because roasting is done at such a low temperature that scarcely any other constituents of the ore than arsenic are volatilized.

Having thus described my invention I declare that what I claim is:—

1. Method for working up auriferous and cupriferous arsenical pyrites or arsenical pyrites in mixture with sulphur pyrites, characterized thereby that a part of the ore is roasted in the ordinary way and smelted for getting matte, which is subjected to blast treatment in a converter, whereas another part of the ore, after having been subjected to roasting, is charged direct into the converter, so as to be blasted together with the matte from the first mentioned part of the ore that has been smelted in a suitable furnace.

2. Method according to claim 1, characterized thereby that in roasting that part of the ore which is going direct into the converter, time, temperature and amount of air are adapted in such a way that any arsenic in the ore is practically altogether roasted away, whereas the bulk of any sulphur in the ore remains.

3. Method according to claim 1, characterized thereby that in roasting that part of the ore which is going direct into the converter, time, temperature and amount of air are adapted in such a way that the bulk of any iron in the ore remains in the roasted goods in the di-valent condition.

4. Method according to claim 1, characterized thereby that that part of the ore, which after roasting is charged direct into the converter, on an average has a higher gold content than that part which after roasting is charged into a suitable furnace for smelting.

5. Method according to claim 1, characterized thereby that that part of the ore, which after roasting is charged direct into the converter, on an average has a lower copper content than that part which is charged direct into a suitable furnace for smelting.

AXEL RUDOLF LINDBLAD.